(12) United States Patent
Chae et al.

(10) Patent No.: US 10,057,932 B2
(45) Date of Patent: Aug. 21, 2018

(54) METHOD AND APPARATUS FOR TRANSCEIVING SIGNAL FROM DEVICE-TO-DEVICE TERMINAL IN WIRELESS COMMUNICATION SYSTEM

(71) Applicant: LG ELECTRONICS INC., Seoul (KR)

(72) Inventors: Hyukjin Chae, Seoul (KR); Hakseong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 201 days.

(21) Appl. No.: 15/025,510

(22) PCT Filed: Oct. 6, 2014

(86) PCT No.: PCT/KR2014/009378
§ 371 (c)(1),
(2) Date: Mar. 28, 2016

(87) PCT Pub. No.: WO2015/050417
PCT Pub. Date: Apr. 9, 2015

(65) Prior Publication Data
US 2016/0219641 A1 Jul. 28, 2016

Related U.S. Application Data

(60) Provisional application No. 61/887,433, filed on Oct. 6, 2013, provisional application No. 61/897,214, filed (Continued)

(51) Int. Cl.
*H04W 76/14* (2018.01)
*H04W 72/14* (2009.01)
(Continued)

(52) U.S. Cl.
CPC .......... *H04W 76/14* (2018.02); *H04L 1/1819* (2013.01); *H04L 1/1854* (2013.01);
(Continued)

(58) Field of Classification Search
None
See application file for complete search history.

(56) References Cited

U.S. PATENT DOCUMENTS

2011/0268006 A1* 11/2011 Koskela ............... H04W 72/121
370/312
2013/0242824 A1* 9/2013 Lee ....................... H04L 1/1819
370/281
(Continued)

FOREIGN PATENT DOCUMENTS

KR 1020070019755 2/2007
KR 1020110030673 3/2011

OTHER PUBLICATIONS

PCT International Application No. PCT/KR2014/009378, Written Opinion of the International Searching Authority dated Jan. 14, 2015, 21 pages.

*Primary Examiner* — Gregory Sefcheck
*Assistant Examiner* — Srinivasa Reddivalam
(74) *Attorney, Agent, or Firm* — Lee Hong Degerman Kang Waimey (57) ABSTRACT

An embodiment of the present invention provides a method for a terminal for transceiving a device-to-device (D2D) signal in a wireless communication system, the method for transceiving a D2D signal comprising: receiving an uplink grant; and performing uplink transmission in one or more subframes containing a fourth subframe from the subframe in which the uplink grant has been received, wherein if the uplink transmission is a transmission of a redundancy version from two or more subframes corresponding to a single bundle, the terminal receives a PHICH from the uplink
(Continued)

transmission from any one from among the sixth subframe or the 16$^{th}$ subframe from the final subframe from among the two or more subframes.

9 Claims, 7 Drawing Sheets

Related U.S. Application Data on Oct. 29, 2013, provisional application No. 61/901,458, filed on Nov. 8, 2013, provisional application No. 61/903,380, filed on Nov. 12, 2013.

(51) Int. Cl.
  *H04W 72/04* (2009.01)
  *H04L 1/18* (2006.01)
  *H04W 76/02* (2009.01)

(52) U.S. Cl.
  CPC ....... *H04L 1/1887* (2013.01); *H04W 72/0446* (2013.01); *H04W 72/14* (2013.01); *H04W 76/023* (2013.01)

(56) References Cited

U.S. PATENT DOCUMENTS

| | | | |
|---|---|---|---|
| 2013/0242889 A1 | 9/2013 | Khoryaev et al. | |
| 2013/0250869 A1 | 9/2013 | Eriksson | |
| 2013/0250924 A1* | 9/2013 | Chen | H04L 1/1819 370/336 |
| 2013/0258977 A1* | 10/2013 | Kim | H04L 5/0053 370/329 |
| 2014/0098761 A1* | 4/2014 | Lee | H04W 74/006 370/329 |
| 2014/0328329 A1* | 11/2014 | Novlan | H04W 72/042 370/336 |
| 2014/0362832 A1* | 12/2014 | Rudolf | H04L 1/1822 370/336 |
| 2015/0043434 A1* | 2/2015 | Yamada | H04W 72/0446 370/329 |
| 2015/0237644 A1* | 8/2015 | Golitschek Edler von Elbwart et al. | H04W 72/12 370/329 |
| 2015/0327047 A1* | 11/2015 | Tiirola | H04W 8/005 370/338 |
| 2016/0183276 A1* | 6/2016 | Marinier | H04W 72/02 370/329 |

\* cited by examiner

METHOD AND APPARATUS FOR TRANSCEIVING SIGNAL FROM DEVICE-TO-DEVICE TERMINAL IN WIRELESS COMMUNICATION SYSTEM

CROSS-REFERENCE TO RELATED APPLICATIONS

This application is the National Stage filing under 35 U.S.C. 371 of International Application No. PCT/KR2014/009378, filed on Oct. 6, 2014, which claims the benefit of U.S. Provisional Application No. 61/887,433, filed on Oct. 6, 2013, 61/897,214, filed on Oct. 29, 2013, 61/901,458, filed on Nov. 8, 2013 and 61/903,380, filed on Nov. 12, 2013, the contents of which are all hereby incorporated by reference herein in their entirety.

TECHNICAL FIELD

Following description relates to a wireless communication, and more particularly, to a method of transmitting and receiving device-to-device (D2D) signal in device-to-device communication and an apparatus therefor.

BACKGROUND ART

Wireless communication systems are widely deployed to provide various kinds of communication content such as voice and data. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

A device-to-device (hereinafter abbreviated D2D) communication corresponds to a communication scheme transmitting and receiving audio, data and the like between UEs without passing through an evolved Node B (hereinafter abbreviated eNB) by configuring a direct link between the UEs. The D2D communication can include such a communication scheme as a UE-to-UE communication scheme, a peer-to-peer communication scheme and the like. The D2D communication scheme can be applied to a M2M (machine-to-machine) communication, MTC (machine type communication) and the like.

The D2D communication is considered as a method of solving a burden of an eNB resulted from increasing data traffic. For instance, unlike a legacy wireless communication system, the D2D communication transmits and receives data between devices without passing through an eNB. Hence, the D2D communication can reduce network overload. Moreover, if the D2D communication is introduced, it may be able to expect reduced procedures of an eNB, reduced power consumption of devices participating in the D2D, increased data transmission speed, increased network capacity, load distribution, and enlarged a cell coverage and the like.

DISCLOSURE OF THE INVENTION

Technical Task

A technical task of the present invention is to provide a method of transmitting and receiving a D2D signal to which TTI (transmission time interval) bundling is applied in device-to-device communication.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to a first technical aspect of the present invention, a method of transceiving a D2D (device-to-device) signal, which is transceived by a user equipment (UE) in a wireless communication system, includes the steps of receiving a uplink grant and performing uplink transmission in one or more subframes including a subframe appearing after 4 subframes from a subframe in which the uplink grant is received. In this case, if the uplink transmission corresponds to transmission of a redundancy version transmitted in two or more subframes corresponding to a single bundle, the UE can receive PHICH (physical hybrid automatic repeat request indicator channel) in response to the uplink transmission in a subframe appearing after 6 subframes or 16 subframes from a last subframe among the two or more subframes.

To further achieve these and other advantages and in accordance with the purpose of the present invention, according to a second technical aspect of the present invention, a D2D user equipment (UE) transceiving a D2D (device-to-device) signal in a wireless communication system includes a transmission module and a processor, the processor configured to receive a uplink grant and configured to perform uplink transmission in one or more subframes including a subframe appearing after 4 subframes from a subframe in which the uplink grant is received. In this case, if the uplink transmission corresponds to transmission of a redundancy version transmitted in two or more subframes corresponding to a single bundle, the UE can receive PHICH (physical hybrid automatic repeat request indicator channel) in response to the uplink transmission in a subframe appearing after 6 subframes or 16 subframes from a last subframe among the two or more subframes.

The first technical aspect and the second technical aspect can include all or a part of the items described in the following.

One of the at least one or more subframes can definitely transmit a redundancy version 0.

The redundancy version 0 may include the largest number of systematic bits among redundancy versions capable of being transmitted by the uplink transmission.

If the number of subframes included in the single bundle is greater than the number of redundancy versions, a redundancy version 0 or a redundancy version 1 can be transmitted in a subframe exceeding the number of the redundancy versions.

If the number of subframes included in the single bundle is greater than the number of redundancy versions, a redundancy version including systematic bits only can be transmitted in a subframe exceeding the number of the redundancy versions.

A size of the single bundle may be different from each other in a first transmission and a retransmission.

If the number of subframes included in the single bundle is greater than the number of redundancy versions, a redundancy version to be transmitted in a subframe exceeding the number of the redundancy versions can be indicated by an MCS field included in the uplink grant.

A size of the single bundle may correspond to one selected from the group consisting of 2, 3, 4, 5 and 6.

If round trip time of the UE corresponds to 20 ms, a subframe in which the PHICH is received may correspond to the subframe appearing after 6 subframes from the last subframe among the two or more subframes.

A subframe in which the uplink transmission is performed can be definitely included in a D2D resource pool.

If the uplink signal corresponds to a D2D discovery signal, a redundancy version 0 can be transmitted only.

A subframe in which the uplink transmission is performed may include a non-contiguous subframe according to a position of the subframe in which the uplink grant is received.

Advantageous Effects

According to the present invention, it is able to transmit and receive a signal in a manner of applying TTI bundling to the signal in D2D communication, thereby reducing overhead and increasing signal reliability and coverage.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc. And, the 'terminal' can be replaced with such a term as a UE (user equipment), an MS (mobile station), an MSS (mobile subscriber station), an SS (subscriber station), etc. In the following description, 'base station' may indicate such a device as a node performing scheduling, a cluster head, etc. If a base station or a relay is able to transmit a signal transmitted by a terminal, the base station or the relay can be regarded as a sort of terminal.

A name of a cell described in the following is applied to a transmission and reception point of a base station (eNB), a sector, an RRH (remote radio head), a relay and the like and the name of the cell can also be used as a comprehensive term to identify a component carrier in a specific transmission and reception point.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink.

LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

Figure 1:
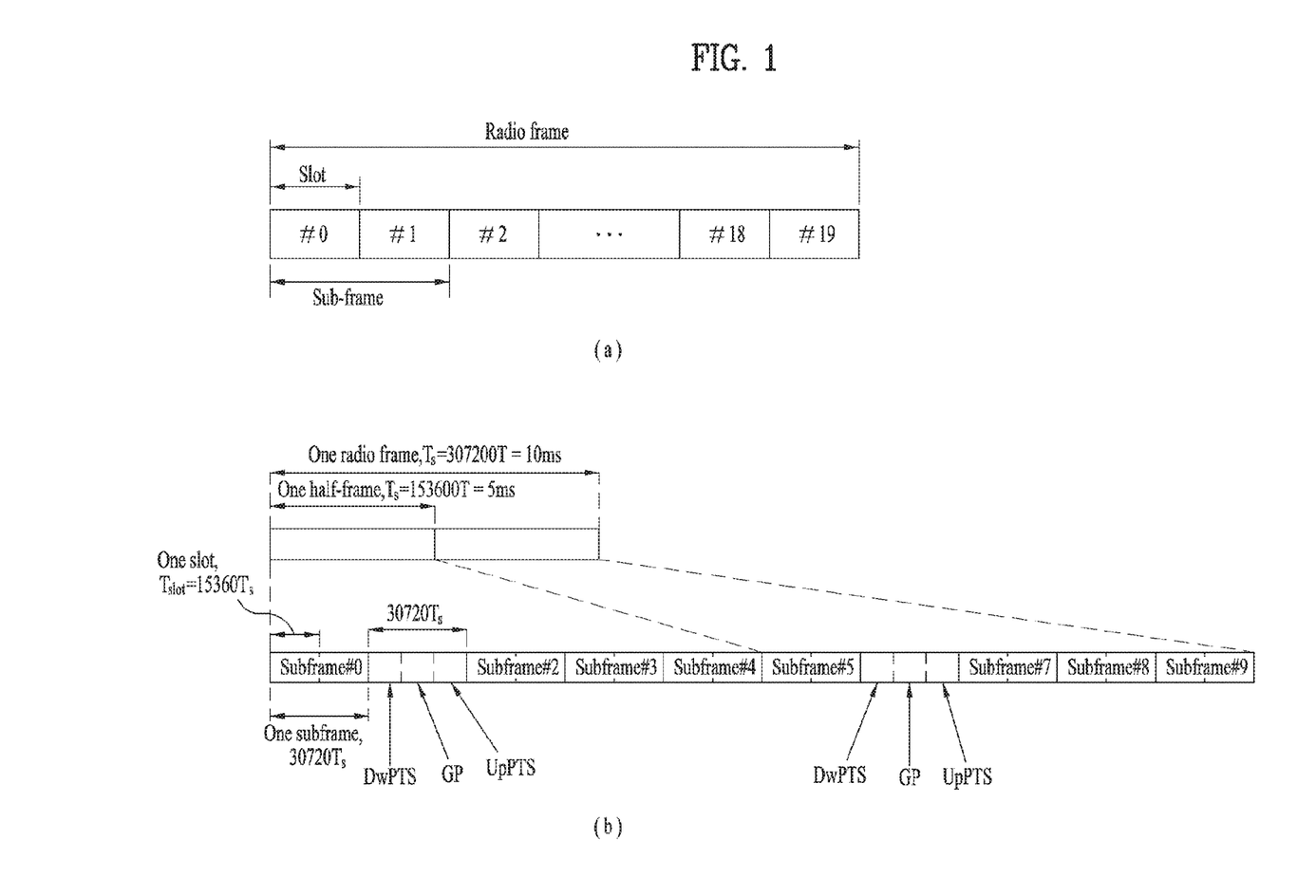
FIG. 1 is a diagram for a structure of a radio frame.

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
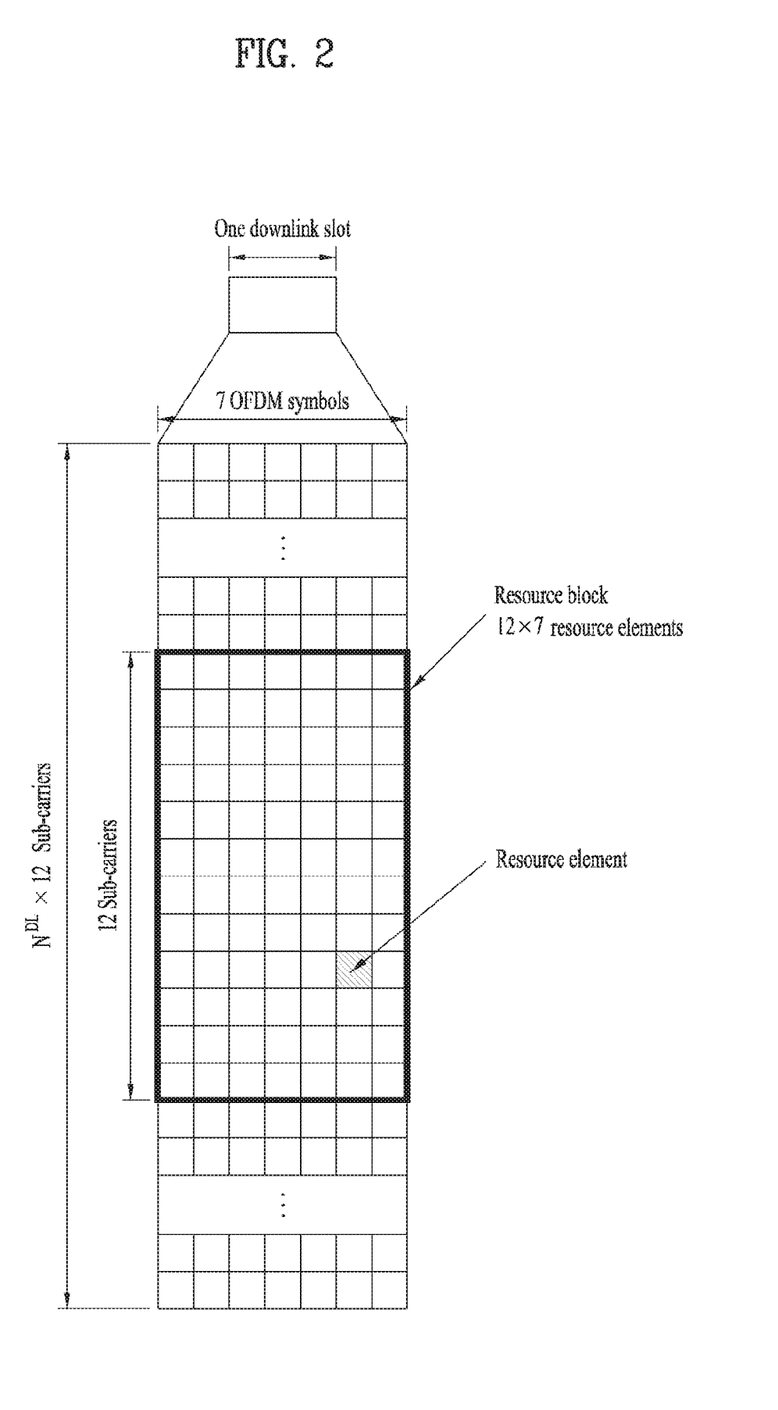
FIG. 2 is a diagram for a resource grid in downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
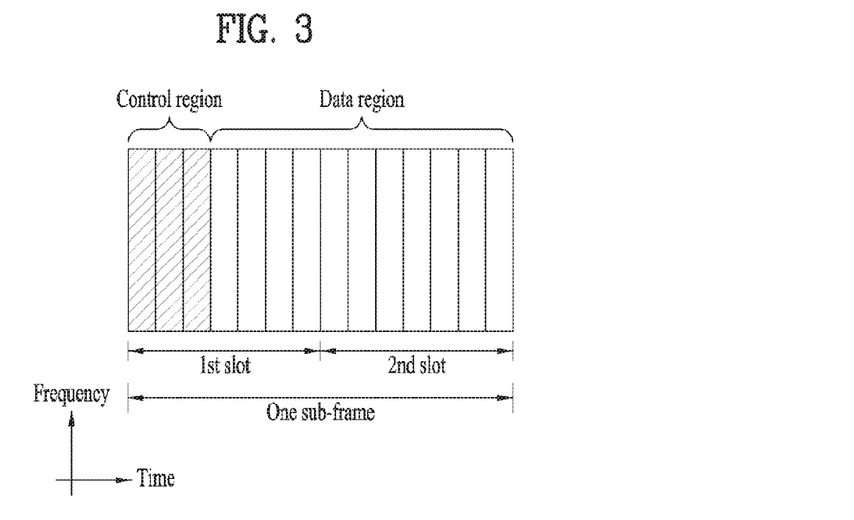
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The number of CCEs necessary for the PDCCH may be changed depending on a size, a coding rate and the like of the DCI. For instance, one of 1, 2, 4 and 8 CCEs (corresponding to PDCCH formats 0, 1, 2, and 3, respectively) can be used for PDCCH transmission. If a DCI size is large and/or if a low coding rate is required due to a poor channel state, a relatively large number of CCEs may be used to transmit a single PDCCH. An eNB determines a PDCCH format in consideration of a size of DCI transmitted to a UE, a cell bandwidth, the number of downlink antenna ports, the amount of PHICH resources, etc. and adds CRC (cyclic redundancy check) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
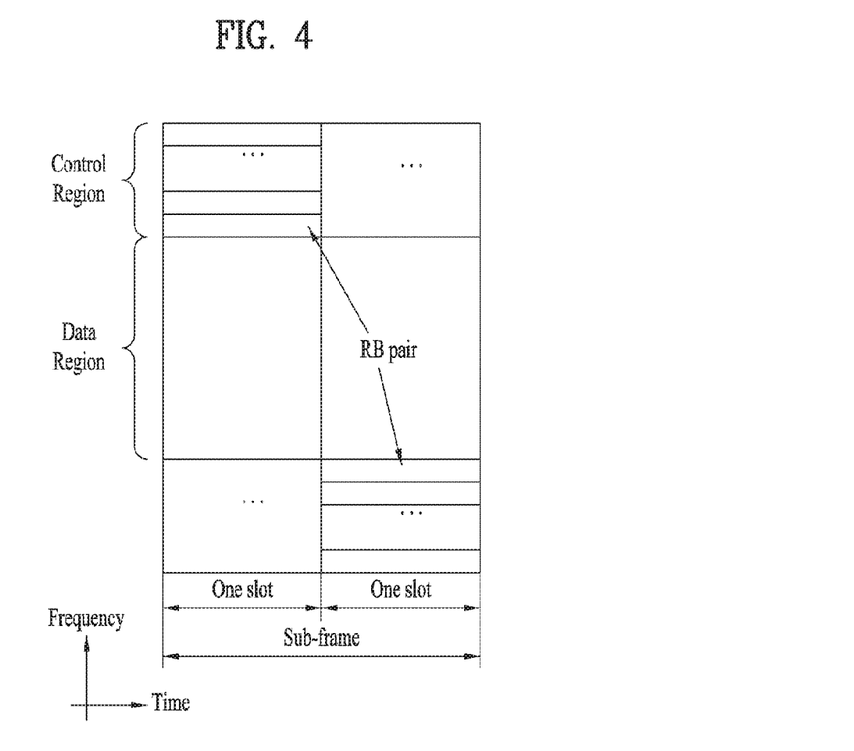
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

TTI Bundling

PUSCH VoIP of a legacy LTE system (e.g., Release-8/9/10) uses TTI bundling to expand coverage. The TTI bundling corresponds to a technology of repeatedly transmitting a packet as much as TTI corresponding to a bundling size (e.g., 4).

Figure 5:
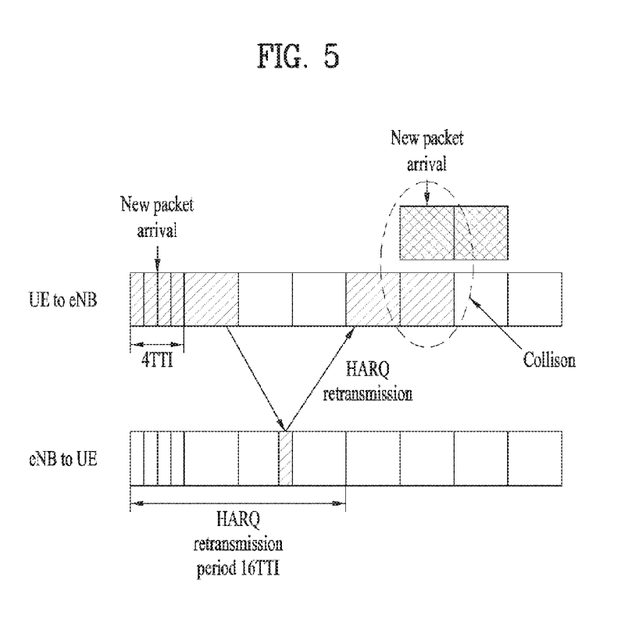
FIG. 5 is a diagram for explaining TTI bundling.

FIG. 5 is a diagram for comparing redundancy with each other according to whether or not TTI bundling is used.

FIG. 5 (a) shows an example of not using TTI bundling and FIG. 5 (b) shows an example of using 4 TTI bundling. If the TTI bundling is not used, an RLC header and an MAC header are transmitted in every TTI. On the contrary, if the TTI bundling is used, since one RLC header and one MAC header are included in 4 TTIs, it is able to reduce the RLC header and the MAC header. That is, if the TTI bundling is used, it may be able to obtain an effect of reducing redundancy. Compared to a case of not using the TTI bundling, 4 TTI bundling may have an effect of reducing overhead as much as 120 bits. If the effect is represented by a ratio, 4 TTI bundling may have an effect of reducing overhead as much as 7.6%.

An UL HARQ process of a legacy FDD system is explained in the following. If a user equipment (UE) transmits data in an $n^{th}$ subframe, the UE receives PHICH ACK/NACK (A/N) from a base station in an $(n+4)^{th}$ subframe. Having received the NACK, the UE performs retransmission in an $(n+8)^{th}$ subframe. In this case, if 4 TTI bundling is used, since the $n^{th}$, $(n+1)^{th}$, $(n+2)^{th}$, and $(n+3)^{th}$ subframes form an one time bundled packet, the base station receives the last $(n+3)^{th}$ subframe and then transmits A/N after minimum 4 subframes and the UE performs retransmission again after minimum 4 subframes. If TTI bundling is used to make a multiple of 8 corresponding to a legacy HARQ period, retransmission is performed in an $(n+16)^{th}$ subframe. Hence, a retransmission period for a 4 TTI bundling corresponds to 16 TTIs. This may indicate that maximum 3 retransmissions of TTI bundling are assigned to satisfy a strict constraint (i.e., 50 ms) for VoIP waiting time (latency) or 4 retransmissions are assigned to satisfy a less strict constraint (i.e., 52 ms) for the waiting time (latency) in an air-interface. In addition to the constraint, it may consider that a transfer rate of a VoIP packet arrived at a physical layer from a higher layer corresponds to 20 ms.

In summary, in a legacy LTE system, a size of TTI bundling corresponds to 4 and a redundancy version (RV) has been transmitted in an order of RV 0, 2, 3 and 1. Yet, since the bundling size is fixed to 4, it was difficult to perform TTI bundling in a part of UL/DL configurations of TDD.

Figure 6:
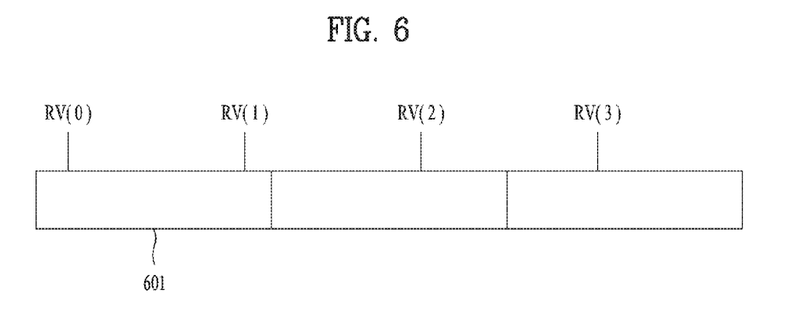
FIGS. 6 to 8 are diagrams for explaining TTI bundling in TDD according to embodiments of the present invention.

In the following description, a case of using TTI bundling by changing a size of the TTI bundling and various matters related to the TTI bundling are explained. In particular, the following description can be applied to transmission and reception of a TDD and/or a D2D signal. According to an embodiment of the present invention, it may use various bundling sizes such as 2, 3, 4, 5, 6 and the like in case of performing TTI bundling. In the following, for clarity, assume that the number of RVs corresponds to 4 and a turbo code corresponds to ⅓ of a coding rate. Of course, a scope of the present invention may be non-limited by the number of RVs and the coding rate. It may use RVs of a different number and a different coding rate as well. FIG. 6 shows RVs defined in a system to which circular buffer rate matching is applied. Assume that a space between RVs corresponds to a result of dividing a size of all circular buffers by the number of RVs. First ⅓ part 601 corresponds to a part including many systematic bit parts or systematic bits. The remaining ⅔ part corresponds to a parity part. Hence, an RV 0 may correspond to an RV including the largest number of systematic bits or an RV including systematic bits only in the following.

Definition of TTI Bundling Size and RV Order

If a size (the number of subframes included in a bundle) of TTI bundling is greater than the number of RVs, an RV 0 and/or an RV 1 can be transmitted in a subframe exceeding the number of RVs. Or, if a size of TTI bundling is greater than the number of RVs, an RV including systematic bits only can be transmitted in a subframe exceeding the number of RVs. In this case, it may be able to obtain SNR gain in a manner of more frequently transmitting a systematic bit or an RV including the large number of systematic bits.

It may also be able to obtain SNR gain in a manner of including an RV 0 in every bundle not only for a case that a size of TTI bundling is greater than the number of RVs but also for a case that the size of TTI bundling is less than the number of RVs. In other word, an RV 0 (an RV including the largest number of systematic bits or an RV including systematic bits only) can be definitely transmitted in a subframe from among subframes corresponding to a bundle. In this case, RVs included in a bundle together with the RV 0 can be circulated in an order of 0, 2, 3 and 1 or can be determined according to a specific different order.

And, an RV order can be determined according to a size of TTI bundling. In the following, RVs, which are transmitted according to a size of TTI bundling, are explained in more detail. In the following description, a serial number of two or more digits (e.g., 02) corresponds to an RV number and bundles are distinguished from each other on the basis of an arrow. For example, in case of 02→31, first transmission is performed in an order of an RV 0 and RV 2 of a bundling size 2 and next transmission can be performed in an order of an RV 3 and RV 1.

If a size of TTI bundling corresponds to 2, it may able to transmit RVs according to a legacy RV order in a manner of matching the legacy RV order with each TTI bundling size such as 02→31→02→31→02. In particular, an RV 0 and RV 2 are transmitted at first transmission, an RV 3 and an RV 1 are transmitted at retransmission, and the RV 1 and the RV 2 are transmitted again at next retransmission. Yet, this is just an example. Such an RV order as 0, 1, 2 and 3 can be determined in advance and RVs can be transmitted in an order of 01→23 in a manner of matching the RV order with a TTI bundling size.

Or, it may be able to include an RV 0 in every bundle/retransmission like 02→01→03→02. An RV transmitted together with the RV 0 may change in every retransmission. As a different embodiment, it may also be able to transmit the RV 0 in a manner of selecting two from a legacy RV order like RV 02→02→02.

If a size of TTI bundling corresponds to 3, 3 RVs are sequentially transmitted according to a legacy RV order in such an order as 023→102→310→231→023. In this case, it may be able to change an RV order in each bundling or change an order of an RV group when retransmission is performed. For example, it may use such a modified order as 023→012→013→123→023 and 012→023→013→123→012. When a bundle size corresponds to 3, it may be able to transmit an RV 0 in every bundle to more frequently transmit the RV 0. For example, the RV 0 can be transmitted in such an order as 023→013→012→023. As a different embodiment, it may also be able to transmit the RV 0 in a manner of selecting three from a legacy RV order like RV 023→023→023. As mentioned in the foregoing description, an RV transmitted with the RV 0 may change.

If a size of TTI bundling corresponds to 5, RVs can be sequentially transmitted via 5 TTI bundles according to a legacy RV order in such an order as 02310→23102→31023→10231→02310. In this case, it may be able to change an RV order in each TTI bundling or change a transmission order between TTI bundles. In particular, since a size of a TTI bundle is greater than 4 corresponding to the number of RVs, it may be able to transmit an RV 0 or an RV 1 one more time in a corresponding subframe, i.e., additional TTI. For example, it may be able to transmit RVs in such an order as 02310→02311→02310 or 02310→02310. Or, a position of an RV, which is transmitted one more time, may change in a manner of transmitting the RV 0 before a legacy order (0231) and transmitting the RV 0 after the 0231 in such an order as 00231→02310→00231.

If a size of TTI bundling corresponds to 6, RVs can be sequentially transmitted via 6 TTI bundles according to a legacy RV order in such an order as 023102→310231→023102. And, an RV 0 and/or an RV 1 are transmitted one more time in additional TTI. For example, the RV 0 and/or the RV 1 can be transmitted in such an order as 020301→020301 or 023100→023100. Or, a position of an RV, which is transmitted two times, may change in a manner of transmitting the RV 0 two times before a legacy order (0231) and transmitting the RV 0 two times after the 0231 in such an order as 000231→023100→000231.

Meanwhile, a size of a bundle in a previous transmission may be different from a size of a bundle in a next transmission. For example, a size of a bundling can be respectively (differently) configured in a first transmission and a next transmission. That is, it may be able to use a flexible TTI bundling. In case of using the flexible TTI bundling, RVs can be transmitted in each bundle according to the aforementioned description. Specifically, for example, if a TTI size exceeds 4, an RV 0 can be always transmitted in additional TTI. In particular, if a bundle size corresponds to 6→4→4→4, 2 TTIs out of 6 TTIs of the first bundle can transmit an RV 0. In this case, a position at which an additional RV 0 is transmitted can be configured in various ways including 023100, 000231, 020031, 023001, 020301, etc. Or, RVs can be transmitted in a manner of being circulated according to an order of 0231 irrespective of a bundle size. For example, if a bundle size varies like 4→6→4→4, RVs can be transmitted in such an order as 0231→023102→3102→3102. In this case, it is able to see that an RV order is changed at 4 TTI bundle after a TTI bundle other than 4 is transmitted.

Meanwhile, if a TTI bundling is configured, QPSK (quadrature phase shift keying) modulation is usable only. Hence, an MCS field of a DCI format 0 can use a specific state only. Hence, the remaining MCS field can be used for a usage of dynamically configuring/indicating an RV. Specifically, if a TTI bundling is configured, the remaining part of the MCS field can indicate an RV of an UL subframe interlocked with DCI. Or, the remaining part of the MCS field can indicate an RV only when a TTI bundling is configured and a bundle size exceeds 4. If an indication related to an RV does not exist in the MCS field, RVs are transmitted according to a predetermined order (one of the aforementioned orders). If an indication on an additional TTI bundle exists, a UE can transmit a corresponding RV.

TTI Bundling in TDD

TTI bundling was available for a TDD UL/DL configuration 0, 1 and 6 in a legacy LTE/LTE-A system. As mentioned in the foregoing description, if a size of TTI bundling is flexible, it may also be able to apply the TTI bundling to other configurations except the TDD UL/DL configuration 0, 1 and 6. For example, as shown in Table 1 in the following, a bundling size can be determined according to a TDD UL/DL configuration.

TABLE 1

| TDD UL/DL configuration | TTI bundling size |
| --- | --- |
| 0 | 6 |
| 1 | 4 |
| 2 | 2 |
| 3 | 3 |
| 4 | 2 |
| 5 | 1 |
| 6 | 4 |

Figure 7:
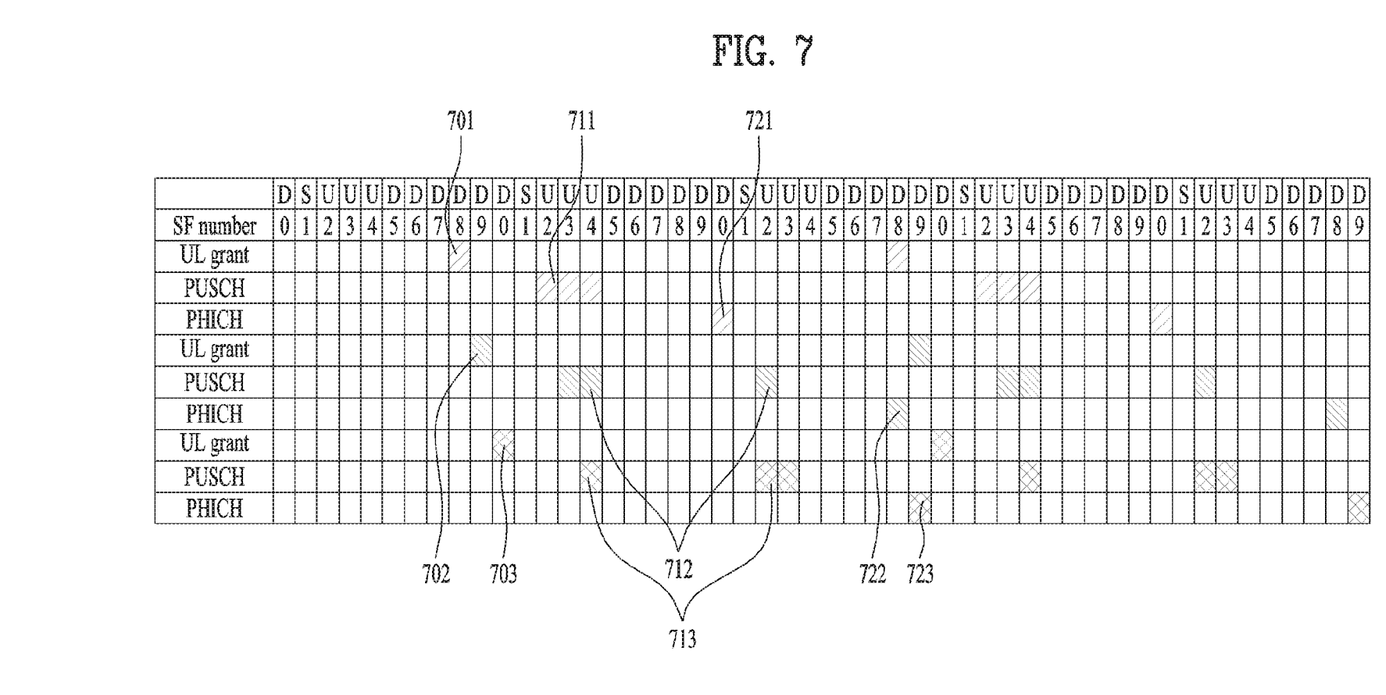
Figure 8:
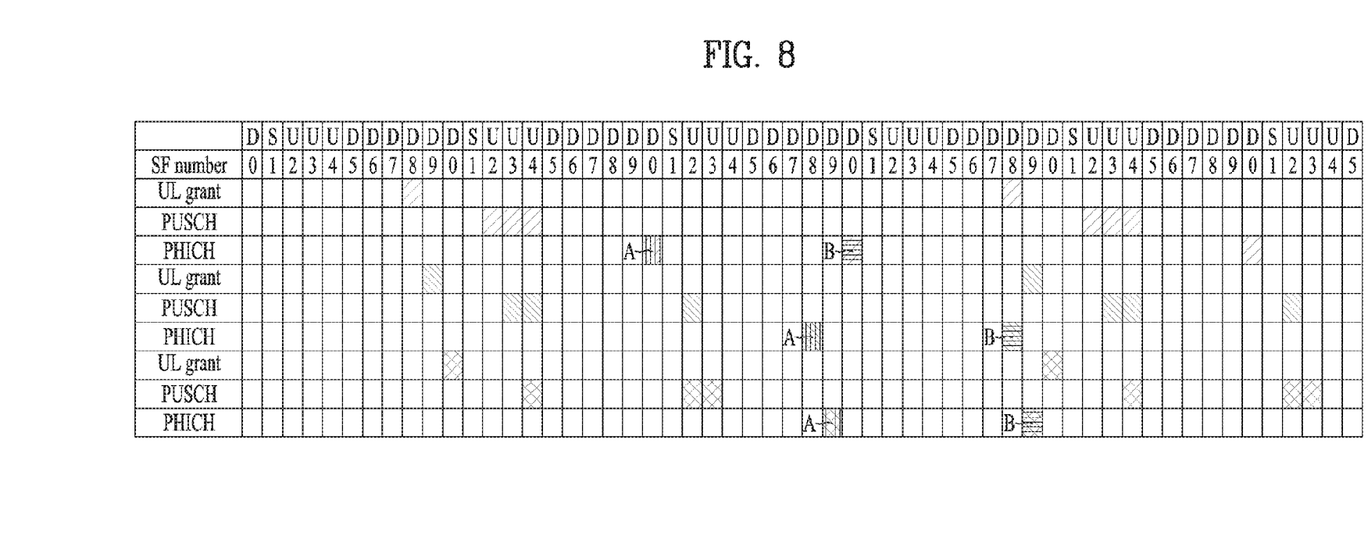

As shown in the aforementioned example, if the TTI bundling is applied to other configurations except the TDD UL/DL configuration 0, 1 and 6, it is necessary to determine a UL grant, PUSCH transmission for the UL grant and transmission timing of PHICH for the PUSCH transmission. Specifically, a TDD UL/DL configuration 3 is explained with reference to FIGS. 7 to 8 in the following. Referring to FIG. 7, if a UE receives a UL grant (701, 702 and 703, respectively), UL transmission (i.e., PUSCH transmission) can be performed in one or more subframes (711, 712 and 713, respectively) including a subframe appearing after 4 subframes from a subframe in which the UL grant is received. Subsequently, the UE can receive PHICH for the UL grant in a subframe (721, 722 and 723, respectively) appearing after 6 subframes from a last subframe among subframes corresponding to a bundle (i.e., two or more subframes corresponding to a bundle). In particular, FIG. 7 shows to a situation that RTT corresponds to 20 ms. If the RTT corresponds to 30 ms, the UE can receive PHICH for the UL grant in a subframe (FIG. 8 A) appearing after 6 subframes or a subframe (FIG. 8 B) appearing after 16 subframes from a last subframe corresponding to a bundle. In particular, if bundling is not applied, the UE can receive PHICH for a bundle at PHICH timing corresponding to a last UL subframe of the bundle (FIG. 8 A) or may be able to receive PHICH for the bundle at PHICH timing closest to retransmission timing (FIG. 8 B). In the former case, it may have a merit in that PHICH resource allocation with a legacy UE is simplified. In the latter case, it may have a merit in that scheduling is simplified in a manner of separating PHICH timing from legacy UEs after decoding is performed.

In summary, for a TDD UL/DL configuration 3 and a subframe bundling operation, a UE detects PDCCH/EPD-CCH transmission in a subframe n and/or PHICH transmission in a subframe n−1 using a DCI format 0. Corresponding first PUSCH transmission can be performed in a subframe n+k. In this case, in case of RTT of 20 ms, 1 and k may follow Table 2 and Table 3, respectively. In case of RTT of 30 ms, 1 and k may follow Table 2 and Table 3, respectively.

TABLE 2

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | |
| 2 | | | | 4 | | | | | 4 | 4 |
| 3 | 4 | | | | | | | | 4 | 4 |
| 4 | | | | | | | | | 4 | 4 |
| 5 | | | | | | 4 | | | | |
| 6 | 7 | 7 | | | | 7 | 7 | | | 5 |

TABLE 3

| \TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 9 | 6 | | | | 9 | 6 | | | |
| 1 | | 2 | | 3 | | | 2 | | | 3 |
| 3 | 1 | | | | | | | | 8 | 1 |
| 6 | 5 | 5 | | | | 6 | 6 | | | 8 |

TABLE 4

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 9 | 6 | | | | 9 | 6 | | | |
| 1 | | 2 | | 3 | | | 2 | | | 3 |
| 3 | 15 | | | | | | | | 18 | 11 |
| 6 | 5 | 5 | | | | 6 | 6 | | | 8 |

TABLE 5

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 9 | 6 | | | | 9 | 6 | | | |
| 1 | | 2 | | 3 | | | 2 | | | 3 |
| 3 | 1 | | | | | | | | 8 | 1 |
| 6 | 5 | 5 | | | | 6 | 6 | | | 8 |

As mentioned in the foregoing description, if TTI bundling is applied in TDD, a transmission order of RVs within a bundle can be determined according to the aforementioned definition of the TTI bundling size and the RV order. And, RVs can be transmitted in a predetermined order up to 4 TTIs and a UE can transmit RVs in a manner of adaptively selecting an RV transmission order at following retransmission.

If the aforementioned description is applied to D2D communication, a subframe in which the UL transmission is performed should be a subframe included in a D2D resource pool. In particular, when TTI bundling is used in D2D, the bundling can be performed only in a subframe in which D2D transmission is permitted. And, in case of D2D communication or discovery, it may repeatedly transmit an RV 0 and/or an RV 1 only.

Meanwhile, it may be able to use a TTI bundling pattern different from each other between a VoIP scheduled by SPS (semi persistent scheduling) and PUSCH scheduled by an individual DCI. According to legacy release 8-11, if a signal such as a TTI bundling corresponds to 'true' in higher layer, having received the signal, a UE applies a TTI bundling of a same pattern to both the VoIP and the PUSCH with a legacy 4TTI bundling size. Yet, in case of the VoIP, since coverage of the VoIP is deficient compared to coverage necessary for transmitting a channel or data, it may be able to apply a new TTI bundling pattern to the VoIP. It is known as it is able to obtain coverage enhancement gain when a condition that resource allocation for TTI bundling is restricted to 3 PRBs or less is released from the legacy release 8-11. Hence, the new TTI bundling pattern can be applied to the VoIP scheduled by SPS only. Therefore, it may be required to have a new signal for applying the new TTI bundling pattern to a release 12 UE and operating the UE. The signal can be defined as follows.

It may be able to define a higher layer signal for triggering the new TTI bundling pattern, e.g., a "TTI bundling enhancement" signal. If a release-12 UE receives the signal, the UE can apply the new TTI bundling pattern according to whether the signal corresponds to 'true' or 'false'. In this case, it may be able to define the new TTI bundling pattern to be used only when the 'TTI bundling enhancement' is scheduled by SPS and the new TTI bundling patter can also be defined for both SPS and dynamic scheduling.

If the TTI bundling enhancement is defined to be used only when the TTI bundling enhancement is scheduled by SPS, an operation of a UE may follow Table 6 in the following.

TABLE 6

| TTI bundling | TTI bundling enhancement | Operation of release-12 UE |
|---|---|---|
| false | false | No TTI bundling is applied |
| True | false | legacy TTI bundling is applied |
| True | True | TTI bundling enhancement pattern is applied to data scheduled by SPS, legacy TTI bundling pattern is applied to data scheduled by DCI |

The 'TTI bundling enhancement' may use a scheme that a size of RTT is reduced to 12. In this case, if VoIP is used by a specific UE, it may be able to obtain coverage gain as much as about 1 dB. In this case, when both VoIP and medium-rate PUSCH such as Internet are provided to a UE of which coverage is deficient at the same time, if the two packets have a same RTT, it may be able to transmit the packets at the same time, thereby reducing transmit power per packet. Hence, although the 'TTI bundling enhancement' is applied, coverage can be reduced due to the simultaneous transmission of the packets. In this case, if RTT is differently configured according to each scheduling scheme, a packet can be transmitted at timings different from each other and insufficient coverage can be obtained from TTI bundling or enhanced TTI bundling.

If the TTI bundling enhancement is defined for both SPS and dynamic scheduling, an operation of a UE may follow Table 7 in the following.

TABLE 7

| TTI bundling | TTI bundling enhancement | Operation of release-12 UE |
|---|---|---|
| false | false | No TTI bundling is applied |
| true | false | Enhanced TTI bundling is applied |
| true | true | |

In this case, if a 3PRB restriction condition is cancelled, it may be able to define operations described in the following.

A) Rel-12 UE cancels 3PRB restriction only when TTI bundling enhancement corresponds to true.

B) Rel-12 UE cancels 3PRB restriction irrespective of whether TTI bundling enhancement corresponds to true or false.

C) When TTI bundling corresponds to true, rel-12 UE specifies no restriction on a PRB size. The PRB size is indicated by a base station. In this case, the base station should be aware of whether or not a corresponding UE corresponds to the rel-12 UE.

According to the A), since a PRB restriction is cancelled only when the TTI bundling enhancement corresponds to true, it is able to anticipate that a release-12 UE/base station uses a packet size equal to or less than 3 PRBs when a legacy TTI bundling is used. This may be helpful for a UE operation and scheduling of a base station. According to the B), since the 3PRB restriction is cancelled at any time, a UE and a base station may use TTI bundling with no restriction on a PRB size. Hence, scheduling complexity may increase compared to the A). According to the C), although the C) is similar to the B), a separate PRB restriction can be indicated by a base station. Hence, a condition for the PRB restriction should follow an indication of the base station.

Device Configuration According to Embodiment of the Present Invention

Figure 9:
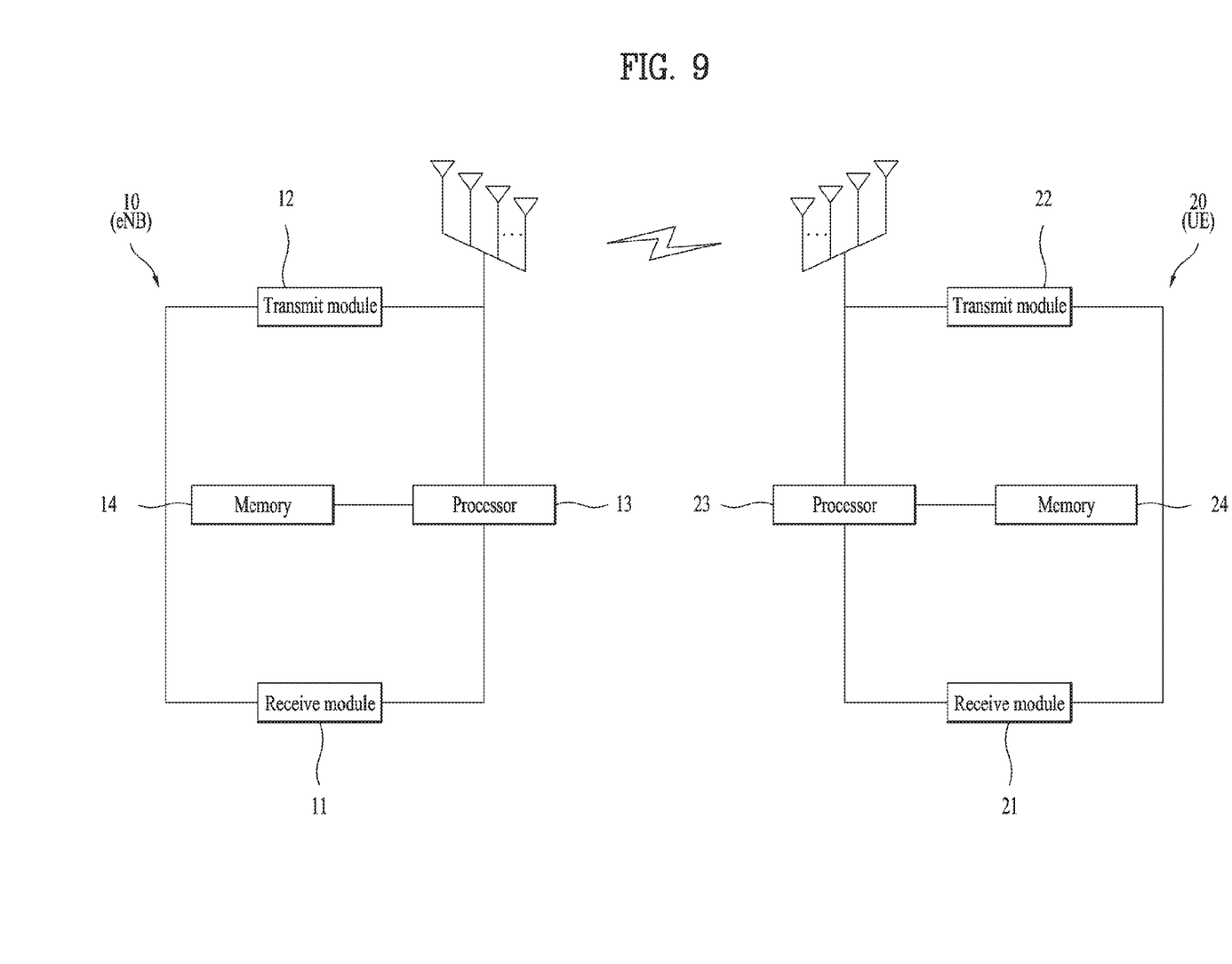
FIG. 9 is a diagram for a configuration of a transceiver.

FIG. 9 is a diagram for configuration of a transmit point apparatus and a user equipment according to embodiment of the present invention.

Referring to FIG. 9, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 9, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 9 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

Embodiments of the present invention are applicable to various mobile communication systems.

What is claimed is:

1. A method of transceiving a D2D (device-to-device) signal, which is transceived by a user equipment (UE) in a wireless communication system, the method comprising:
   receiving a uplink grant; and
   performing an uplink transmission in a single bundle of three, five or six subframes containing a subframe appearing after 4 subframes from a subframe in which the uplink grant is received,
   wherein, when the uplink transmission in the single bundle corresponds to transmission of a redundancy version, the UE receives a PHICH (physical hybrid automatic repeat request indicator channel) in response to the uplink transmission in a subframe appearing after 6 subframes or after 16 subframes from a last subframe among the three, five or six subframes,
   wherein, when the three, five or six subframes consists of three subframes, the UE performs the uplink transmission in the three subframes by transmitting redundancy versions in an order of redundancy version {0, 2, 3}, redundancy version {0, 1, 3}, or redundancy version {0, 1, 2},
   wherein, when the three, five or six subframes consists of five subframes, the UE performs the uplink transmission in the five subframes by transmitting redundancy versions in an order of redundancy version {0, 2, 3, 1, 0} or redundancy version {0, 0, 2, 3, 1}, and
   wherein, when the three, five or six subframes consists of six subframes, the UE performs the uplink transmission in the six subframes by transmitting redundancy versions in an order of redundancy version {0, 2, 3, 1, 0, 0} or redundancy version {0, 0, 0, 2, 3, 1}.

2. The method of claim 1, wherein the redundancy version 0 comprises the largest number of systematic bits among redundancy versions capable of being transmitted by the uplink transmission.

3. The method of claim 1, wherein a size of the single bundle is different from each other in a first transmission and a retransmission.

4. The method of claim 3, wherein if the number of subframes contained in the single bundle is greater than the number of redundancy versions, a redundancy version to be transmitted in a subframe exceeding the number of the redundancy versions is indicated by an MCS field contained in the uplink grant.

5. The method of claim 1, wherein if round trip time of the UE corresponds to 20 ms, a subframe in which the PHICH is received corresponds to the subframe appearing after 6 subframes after the last subframe among the two or more subframes.

6. The method of claim 1, wherein a subframe in which the uplink transmission is performed is definitely contained in a D2D resource pool.

7. The method of claim 1, wherein if the uplink signal corresponds to a D2D discovery signal, a redundancy version 0 is transmitted only.

8. The method of claim 1, wherein a subframe in which the uplink transmission is performed is capable of containing a non-contiguous subframe according to a position of the subframe in which the uplink grant is received.

9. A D2D user equipment (UE) transceiving a D2D (device-to-device) signal in a wireless communication system, the D2D UE comprising:
   a transmitter; and
   a processor, the processor configured to:
   receive a uplink grant, and
   perform an uplink transmission in a single bundle of three, five or six subframes containing a subframe appearing after 4 subframes from a subframe in which the uplink grant is received,
   wherein, when the uplink transmission in the single bundle corresponds to transmission of a redundancy version, the UE receives a PHICH (physical hybrid automatic repeat request indicator channel) in response to the uplink transmission in a subframe appearing after 6 subframes or after 16 subframes from a last subframe among the three, five or six,
   wherein, when the three, five or six subframes consists of three subframes, the UE performs the uplink transmission in the three subframes by transmitting redundancy versions in an order of redundancy versions {0, 2, 3}, redundancy versions {0, 1, 3}, or redundancy versions {0, 1, 2},
   wherein, when the three, five or six subframes consists of five subframes, the UE performs the uplink transmission in the five subframes by transmitting redundancy versions in an order of redundancy versions {0, 2, 3, 1, 0} or redundancy versions {0, 0, 2, 3, 1}, and
   wherein, when the three, five or six subframes consists of six subframes, the UE performs the uplink transmission in the six subframes by transmitting redundancy versions in an order of redundancy versions {0, 2, 3, 1, 0, 0} or redundancy versions {0, 0, 0, 2, 3, 1}.

* * * * *